(12) United States Patent
Subramanian et al.

(10) Patent No.: US 11,966,307 B2
(45) Date of Patent: *Apr. 23, 2024

(54) RE-ALIGNING DATA REPLICATION CONFIGURATION OF PRIMARY AND SECONDARY DATA SERVING ENTITIES OF A CROSS-SITE STORAGE SOLUTION AFTER A FAILOVER EVENT

(71) Applicant: NetApp, Inc., San Jose, CA (US)

(72) Inventors: Murali Subramanian, Karnataka (IN); Sohan Shetty, Bangalore (IN); Akhil Kaushik, Karnataka (IN)

(73) Assignee: NetApp, Inc., San Jose, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 17/751,410

(22) Filed: May 23, 2022

(65) Prior Publication Data
US 2022/0318105 A1    Oct. 6, 2022

Related U.S. Application Data

(63) Continuation of application No. 17/219,746, filed on Mar. 31, 2021, now Pat. No. 11,360,867.

(51) Int. Cl.
*G06F 11/20* (2006.01)
*H04L 67/1097* (2022.01)

(52) U.S. Cl.
CPC ...... *G06F 11/2069* (2013.01); *G06F 11/2092* (2013.01); *G06F 2201/85* (2013.01); *H04L 67/1097* (2013.01)

(58) Field of Classification Search
CPC ............ G06F 11/2069; G06F 11/2074; G06F 11/2076; G06F 11/2092; G06F 2201/85; G06F 3/067; H04L 67/1097
See application file for complete search history.

(56) References Cited

U.S. PATENT DOCUMENTS 5,742,792 A    4/1998   Yanai et al.
6,389,551 B1   5/2002   Yount
(Continued)

OTHER PUBLICATIONS

U.S. Notice of Allowance dated May 6, 2022 in U.S. Appl. No. 17/219,746, filed Mar. 31, 2021, 18 pages.
(Continued)

*Primary Examiner* — Bryce P Bonzo
*Assistant Examiner* — Albert Li
(74) *Attorney, Agent, or Firm* — Jaffery Watson Mendonsa & Hamilton LLP

(57) ABSTRACT

Systems and methods for re-aligning data replication configuration of a cross-site storage solution after a failover are provided. According to one embodiment, after a failover, the new primary distributed storage system orchestrates flipping of the data replication configuration of a peered consistency group (CG) to reestablish zero RPO and zero RTO protections for the peered CG. The primary causes the secondary distributed storage system to perform an atomic database operation on its remote configuration database to (i) delete an existing source configuration that identifies the secondary as a source of data replication; and (ii) persist a new destination configuration identifying the secondary as a destination of data replication. Then, the primary performs an atomic database operation on its local configuration database to (i) delete an existing destination configuration identifying the primary as the destination; and (ii) persist a new source configuration identifying the distributed storage system as the source.

20 Claims, 9 Drawing Sheets

(56) References Cited

U.S. PATENT DOCUMENTS

| | | | |
|---|---|---|---|
| 6,415,372 B1 | 7/2002 | Zakai et al. | |
| 6,823,349 B1* | 11/2004 | Taylor | G06F 11/2082 |
| 7,039,827 B2 | 5/2006 | Meyer et al. | |
| 7,500,014 B1 | 3/2009 | Jacobson et al. | |
| 7,631,066 B1 | 12/2009 | Schatz et al. | |
| 7,640,451 B2 | 12/2009 | Meyer et al. | |
| 7,890,626 B1 | 2/2011 | Gadir | |
| 8,498,967 B1 | 7/2013 | Chatterjee et al. | |
| 8,645,623 B1 | 2/2014 | O'Shea et al. | |
| 8,856,583 B1 | 10/2014 | Visser et al. | |
| 8,874,960 B1 | 10/2014 | Khan et al. | |
| 9,189,341 B1 | 11/2015 | Natanzon et al. | |
| 10,412,066 B1 | 9/2019 | Vemuri | |
| 10,496,320 B2 | 12/2019 | Eisler et al. | |
| 10,725,691 B1 | 7/2020 | Kaushik et al. | |
| 10,761,768 B1 | 9/2020 | Kaushik et al. | |
| 11,036,423 B2 | 6/2021 | Kaushik et al. | |
| 11,089,105 B1 | 8/2021 | Karumbunathan et al. | |
| 11,360,867 B1 | 6/2022 | Subramanian et al. | |
| 2002/0132613 A1 | 9/2002 | Leung et al. | |
| 2004/0153719 A1* | 8/2004 | Achiwa | G06F 11/2041 |
| | | | 714/6.32 |
| 2005/0229034 A1 | 10/2005 | Fujibayashi | |
| 2006/0236048 A1 | 10/2006 | Deguchi et al. | |
| 2007/0180307 A1 | 8/2007 | Zohar et al. | |
| 2007/0234006 A1 | 10/2007 | Radulescu et al. | |
| 2008/0201702 A1 | 8/2008 | Bunn | |
| 2009/0043979 A1 | 2/2009 | Jarvis | |
| 2009/0089609 A1 | 4/2009 | Baba | |
| 2009/0307530 A1 | 12/2009 | Tarta | |
| 2010/0064168 A1 | 3/2010 | Smoot et al. | |
| 2010/0082962 A1 | 4/2010 | Srinivasan et al. | |
| 2010/0161554 A1 | 6/2010 | Datuashvili et al. | |
| 2011/0106855 A1 | 5/2011 | Resch et al. | |
| 2011/0314148 A1 | 12/2011 | Petersen et al. | |
| 2012/0151249 A1 | 6/2012 | Swan et al. | |
| 2014/0298136 A1 | 10/2014 | Resch et al. | |
| 2015/0006949 A1 | 1/2015 | Bittles et al. | |
| 2015/0058838 A1 | 2/2015 | Tsirkin | |
| 2016/0366226 A1 | 12/2016 | Friedman et al. | |
| 2017/0093983 A1 | 3/2017 | Everhart et al. | |
| 2018/0260125 A1 | 9/2018 | Botes et al. | |
| 2018/0352032 A1 | 12/2018 | Liu et al. | |
| 2019/0004908 A1 | 1/2019 | Gopinath et al. | |
| 2019/0034286 A1 | 1/2019 | Brown et al. | |
| 2019/0229978 A1 | 7/2019 | Rajvaidya et al. | |
| 2019/0347352 A1 | 11/2019 | Gochkov et al. | |
| 2019/0394266 A1 | 12/2019 | Fukuyama et al. | |
| 2020/0026625 A1* | 1/2020 | Konka | G06F 11/2028 |
| 2020/0034258 A1 | 1/2020 | Avraham et al. | |
| 2020/0050495 A1 | 2/2020 | Voutilainen et al. | |
| 2020/0050587 A1 | 2/2020 | Kaushik et al. | |
| 2020/0125460 A1 | 4/2020 | Selvaraj et al. | |
| 2020/0133520 A1 | 4/2020 | Patnaik et al. | |
| 2020/0273984 A1 | 8/2020 | Nakano et al. | |
| 2020/0278984 A1 | 9/2020 | Kaushik et al. | |
| 2020/0319982 A1 | 10/2020 | Rusev et al. | |
| 2020/0356274 A1 | 11/2020 | Kaushik et al. | |
| 2021/0303165 A1 | 9/2021 | Kaushik et al. | |
| 2021/0374157 A1 | 12/2021 | Reddy et al. | |
| 2022/0019350 A1 | 1/2022 | Karr | |
| 2022/0121533 A1 | 4/2022 | Kumar et al. | |

OTHER PUBLICATIONS

Pan L., "Paxos at its heart is very simple," Distributed System, 2018, Retrieved From: https://blog.the-pans.com/paxos-explained/, pp. 1-12.

* cited by examiner

US 11,966,307 B2

RE-ALIGNING DATA REPLICATION CONFIGURATION OF PRIMARY AND SECONDARY DATA SERVING ENTITIES OF A CROSS-SITE STORAGE SOLUTION AFTER A FAILOVER EVENT

RELATED APPLICATIONS

This application is a continuation of U.S. patent application Ser. No. 17/219,746, filed Mar. 31, 2021, which is hereby incorporated by reference in its entirety for all purposes.

BACKGROUND

Field

Various embodiments of the present disclosure generally relate to multi-site distributed data storage systems. In particular, some embodiments relate to reestablishing zero recovery point objective (RPO) and zero recovery time objective (RTO) protections automatically by re-aligning configuration information indicative of a direction of data replication for a mirrored dataset after a failover has switched the roles of the primary and secondary data serving entities of a cross-site high-availability (HA) storage solution.

Description of the Related Art

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be reside within a separate data center with the clusters able to communicate over an unreliable network. The network can be prone to failures leading to connectivity issues such as transient or persistent connectivity issues that may disrupt operations of a business enterprise.

SUMMARY

Systems and methods are described for re-aligning data replication configuration of a cross-site storage solution after a failover. According to one embodiment, a local cluster of a high-availability (HA) storage solution that is operable within a first site maintains a local configuration database including configuration information indicative of a direction of data replication for a dataset of a local consistency group (CG) that is mirrored between the local CG and a remote CG. The local CG includes multiple volumes of the local cluster and the remote CG includes a corresponding multiple volumes of a remote cluster of the HA storage solution that is operable within a second site. Responsive to a failover that has caused (i) the local cluster to be placed into a primary role for serving input/output (I/O) operations relating to the mirrored dataset and (ii) the remote cluster to be placed into a secondary role for serving the I/O operations: the remote cluster, with atomicity on a remote configuration database, is caused by the local cluster to: (a) delete an existing source configuration persisted within the remote configuration database that identifies the remote cluster as a source of data replication; and (b) persist a new destination configuration within the remote configuration database that identifies the remote cluster as a destination of the data replication. With atomicity on the local configuration database: an existing destination configuration persisted within the local configuration database that identifies the local cluster as the destination is deleted by the local cluster and a new source configuration is persisted within the local configuration database that identifies the local cluster as the source.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
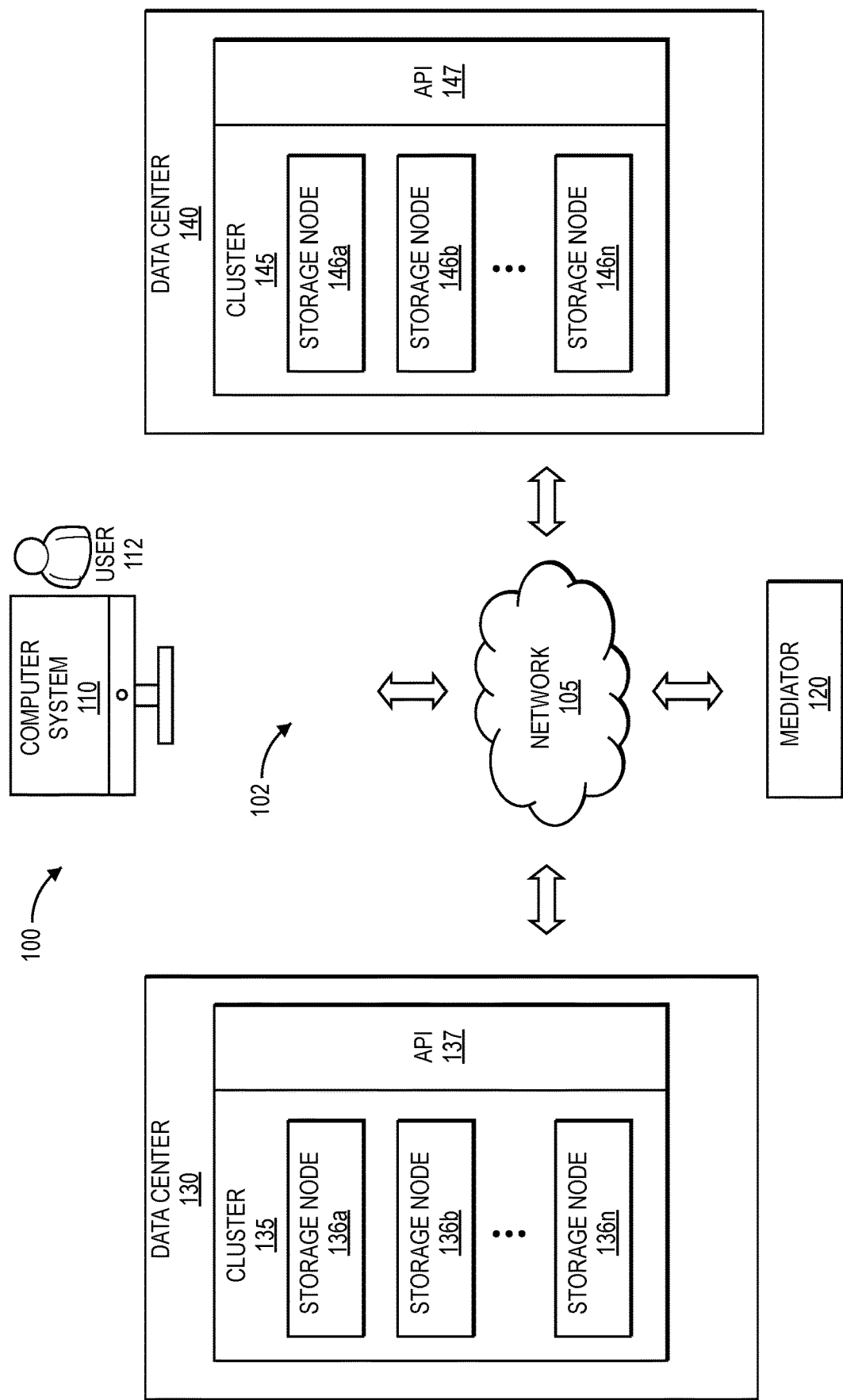
FIG. 1 is a block diagram illustrating an environment in which various embodiments may be implemented.

Systems and methods are described for re-aligning data replication configuration of a cross-site storage solution after a failover. As described further below, in the context of a cross-site storage solution (a/k/a stretched storage), for example, a cross-site high-availability (HA) storage solution that provides transparent application failover across multiple sites (e.g., two sites), a peered pair of distributed storage systems maintains role information indicative of which of the distributed storage systems is the primary data serving entity for a mirrored dataset and which is the secondary data serving entity for the mirrored dataset. For example, each distributed storage system may maintain a flag indicating whether the distributed storage system at issue has the consensus within the cross-site HA storage solution to serve I/O at a particular level of granularity, for example, at the level of granularity of a consistency group (e.g., a set of multiple volumes). The distributed storage systems may also each store data replication configuration information indicative of the direction of data replication in connection with maintaining the mirrored dataset to support zero RPO and zero RTO protections. For example, the configuration of the primary distributed storage system may identify it as the source of data replication for the mirrored dataset and the configuration of the secondary distributed storage system may identify it as the destination of data replication for the mirrored dataset. Responsive to a planned or unplanned failover event, a failover process traditionally focuses on switching the roles of the primary and secondary data serving entities. As such, the role information (e.g., the consensus to serve I/O flags) and the direction of data replication (e.g., the configuration information identifying the respective distributed storage systems as the source or destination of data replication) may be inconsistent after performance of the failover. In such a state, zero RPO and zero RTO protections are no longer active.

Embodiments described herein seek to improve various technological processes associated with cross-site storage solutions (e.g., cross-site high-availability (HA) storage solutions and cross-site asynchronous disaster recovery (DR) solutions). Due to the distributed nature of the cross-site storage solution, there are multiple issues to be addressed after a failover. In addition to the potential for a mismatch between the newly changed roles of the respective data serving entities as a primary (master) data serving entity or a secondary (slave) data serving entity and their existing source or destination data replication configurations, there is a potential for both distributed storage systems to believe they are the primary (master). For example, volumes on both sites may be marked as the master during an intermediate state of failover. As such, as part of a post-failover process, the true master should first be determined to avoid a split-brain scenario and then the true master should flip the data replication direction to reestablish zero RPO and zero RTO protections. Additionally, as various embodiments described herein use the configured role as a destination of data replication as a convention to form the basis of triggering the configuration validation and re-alignment of data replication configuration, at least one of the distributed storage systems should always be configured as the destination. This convention makes it unavoidable to have an intermediate state in which both sites are concurrently configured as the destination. As such, care must be taken to follow the correct order of steps to maintain correctness and reach the eventual expected post failover state of the cross-site storage solutions to properly reestablish zero RPO and zero RTO protections.

According to one embodiment, after a planned or unplanned failover, the new primary distributed storage system of a cross-site HA storage solution orchestrates flipping of the data replication configuration of a peered consistency group to reestablish zero RPO and zero RTO protections for the peered consistency group. As described further below, in one embodiment, local configuration and state information (e.g., data replication configurations and roles) maintained by the distributed storage systems is not authoritative after a failover as such information may be in an intermediate state due to the occurrence of a failure during failover processing. As such, first, in order to avoid a spit-brain scenario, a true primary data serving entity as between the two distributed storage systems may be determined with reference to an authoritative source (e.g., a consensus to serve I/O). The primary then causes the secondary distributed storage system to perform an atomic database transaction to (i) delete its existing source configuration persisted within a remote configuration database of the secondary that identifies the secondary as a source of data replication; and (ii) persist a new destination configuration within the remote configuration database identifying the secondary as a destination of data replication. Subsequently, the primary performs an atomic database transaction on its local configuration database to (i) delete an existing destination configuration persisted within the local configuration database identifying the primary as the destination; and (ii) persist a new source configuration within the local configuration database identifying the distributed storage system as the source.

While some embodiments of the present disclosure are described herein with reference to particular usage scenarios in the context of cross-site HA storage solutions, it is to be noted that various embodiments of the present disclosure are applicable to various use cases that arise in the context of cross-cite storage solutions more generally, including cross-site asynchronous DR solutions.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
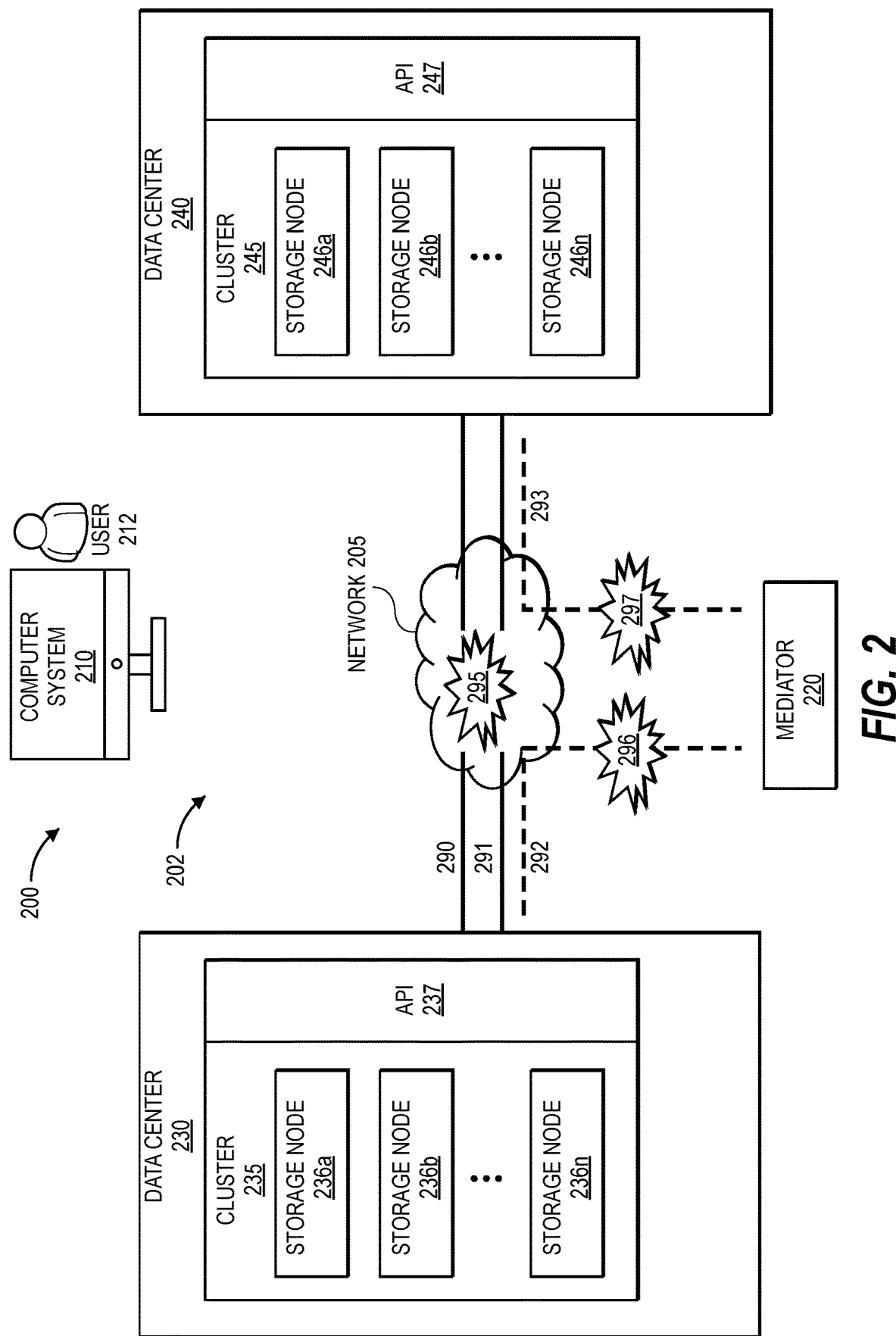
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes at least two storage nodes 236a-b, optionally includes additional storage nodes (e.g., 236n) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes at least two storage nodes 246a-b, optionally includes additional storage nodes (e.g., 246n) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 CGs with each CG having up to 12 volumes. The system 202 provides a planned failover feature at a CG granularity. The planned failover feature allows switching storage access from a primary copy of the data center 230 to a mirror copy of the data center 240 or vice versa.

Figure 3:
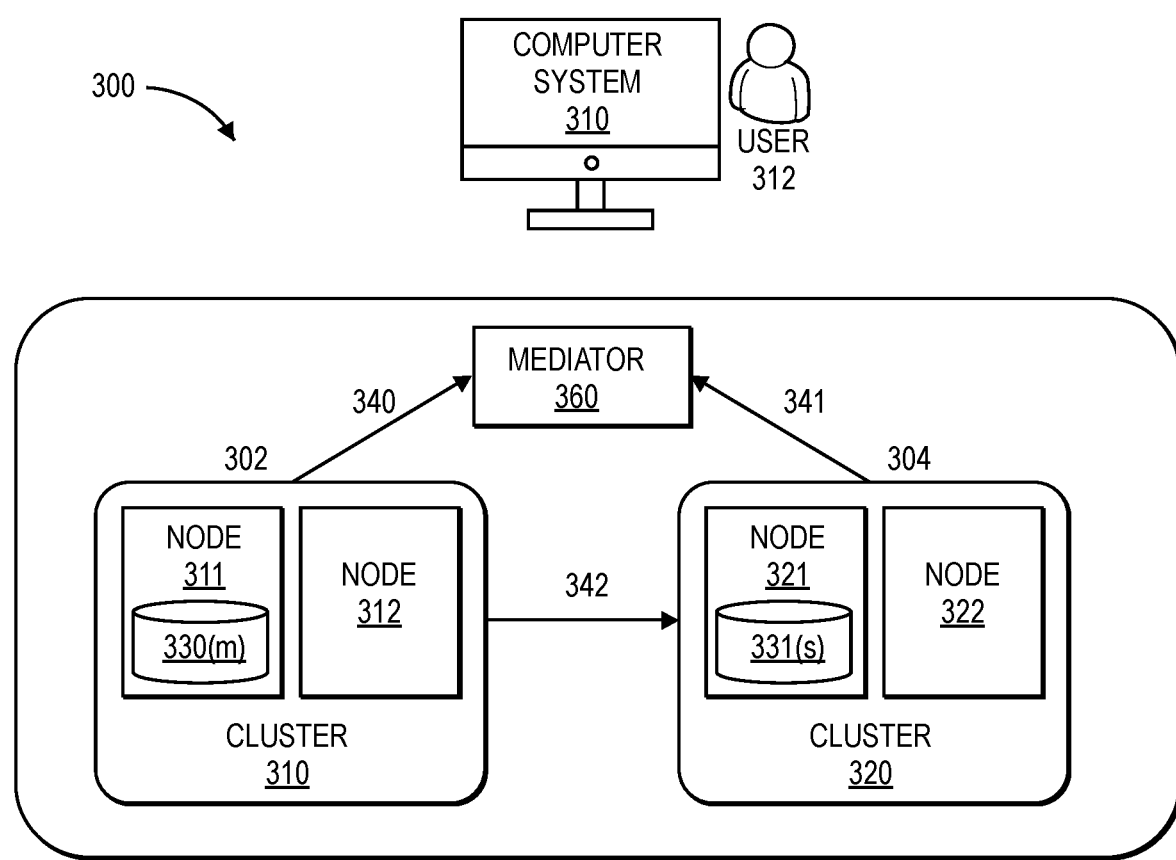
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 312) of the multi-site distributed storage system 302 or a managed service provider responsible for multiple distributed storage systems of the same or multiple customers may monitor various operations and network conditions of the distributed storage system or multiple distributed storage systems via a browser-based interface presented on computer system 310. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the node 311 is designated as a master and the node 321 is designated as a slave. The master is given preference to serve I/O commands to requesting clients and this allows the master to obtain a consensus in a case of a race between the clusters 310 and 320. The mediator 360 enables an automated unplanned failover (AUFO) in the event of a failure. The data copy 330 (master), data copy 331 (slave), and the mediator 360 form a three way quorum. If two of the three entities reach an agreement for whether the master or slave should serve I/O commands to requesting clients, then this forms a strong consensus.

The master and slave roles for the clusters 310 and 320 help to avoid a split-brain situation with both of the clusters simultaneously attempting to serve I/O commands There are scenarios where both master and slave copies can claim to be a master copy. For example, a recovery post failover or failure during planned failover workflow can results in both clusters 310 and 320 attempting to serve I/O commands In one example, a slave cannot serve I/O until an AUFO happens. A master doesn't serve I/O commands until the master obtains a consensus.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (master) while operations received by the node 321 (slave) are proxied to node 311.

Example Storage Node

Figure 4:
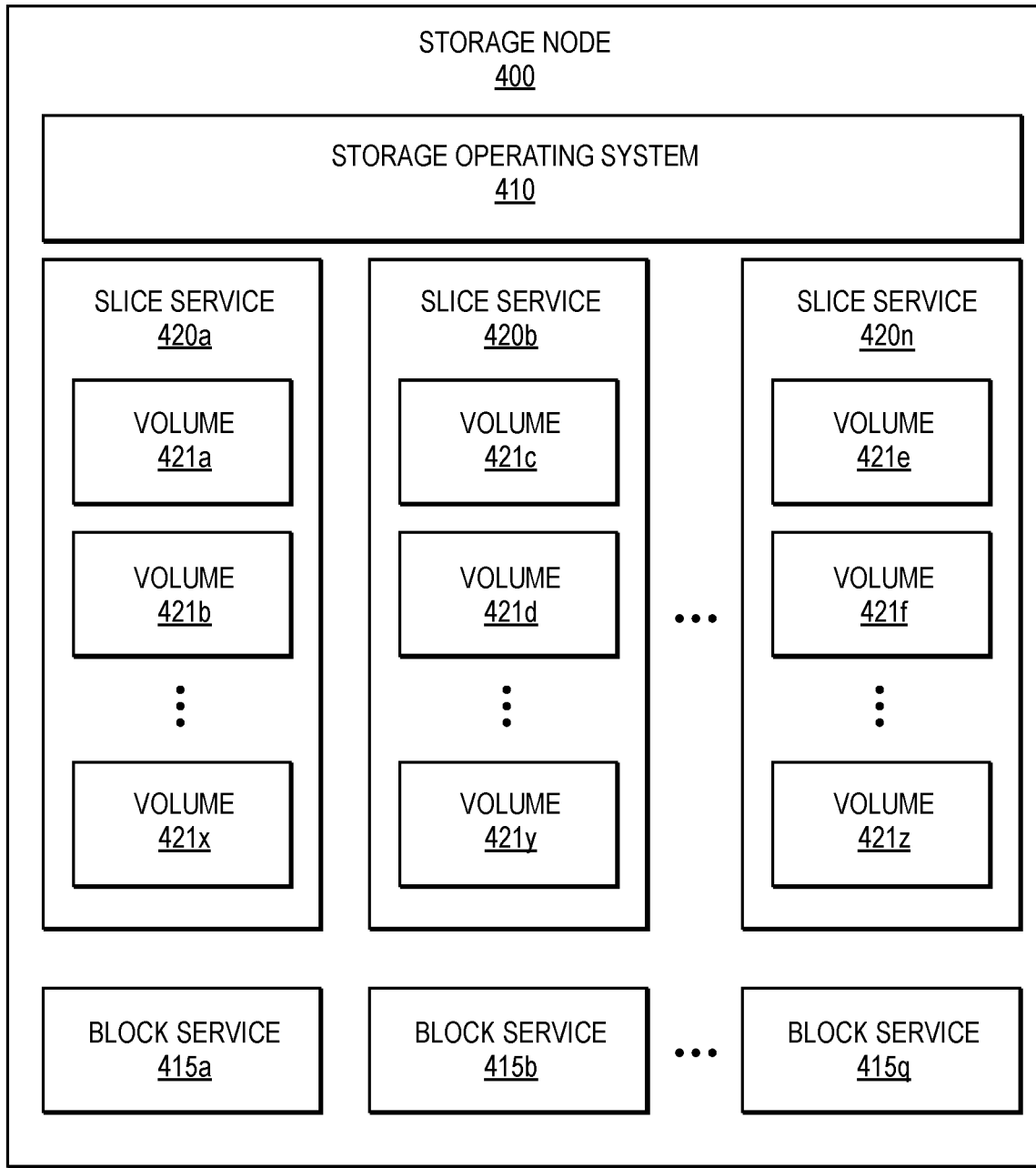
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 331, 322, 712, 714, 752, 754) described herein. In the context of the present example, storage node 400 includes a storage operating system 410, one or more slice services 420a-n, and one or more block services 415a-q. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
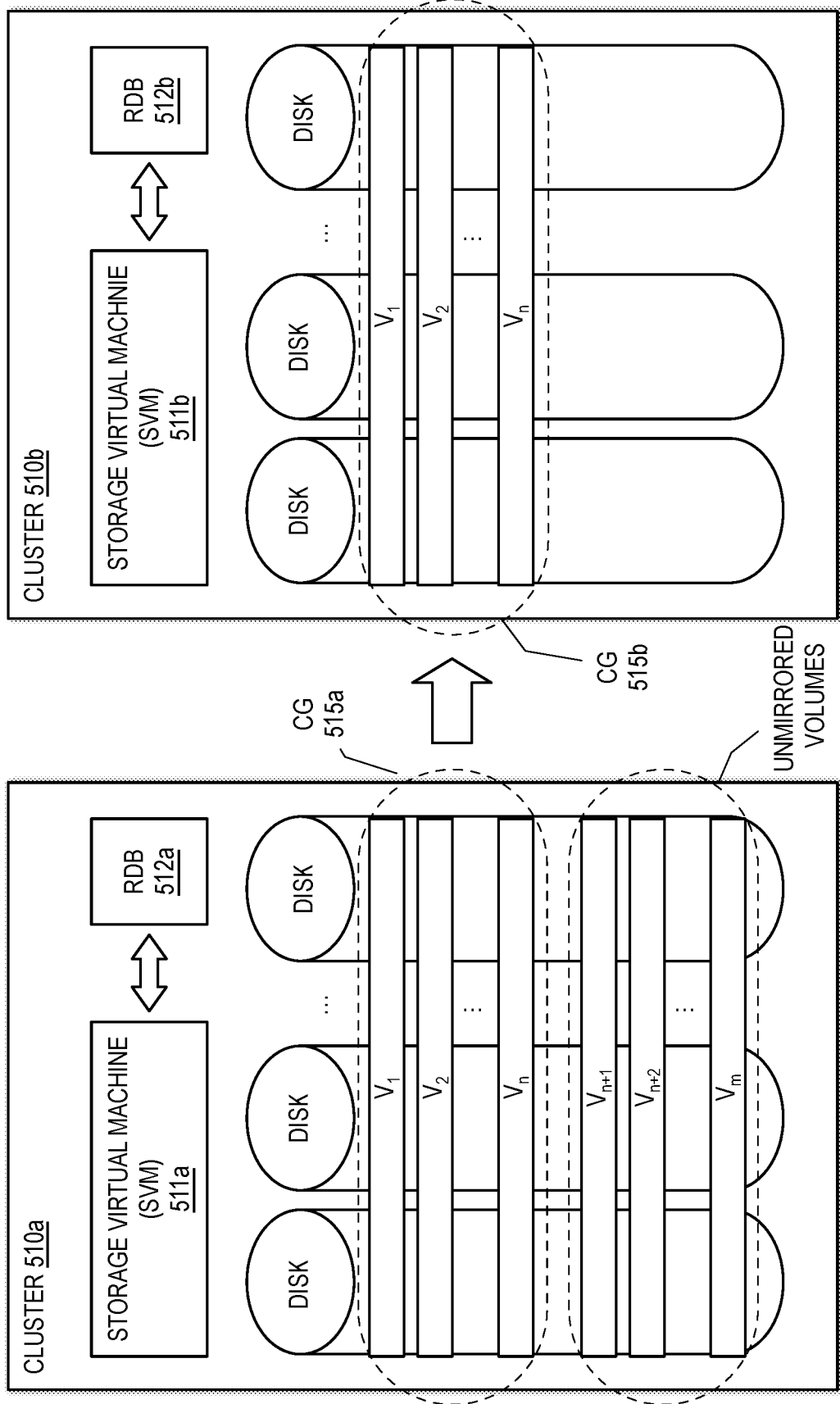
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 110a and 110b) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 110a may be operable within a first site (e.g., a local data center) and cluster 110b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 115a or CG 115b). A CG is a collection of storage objects or data containers (e.g., volumes) within a cluster that are managed by a Storage Virtual Machine (e.g., SVM 111a or SVM 111b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 115a may be referred to as a local CG from the perspective of cluster 110a and as a remote CG from the perspective of cluster 110b. Similarly, CG 115a may be referred to as a remote CG from the perspective of cluster 110b and as a local CG from the perspective of cluster 110b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 112a and 112b), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115b) to which data is configured to be synchronously replicated may be referred to as being in the role of a destination CG, whereas the CG (e.g., CG 115a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or master cluster to a secondary or slave cluster), data replication may also be performed asynchronously and/or within the same cluster. Similarly, a single remote CG may protect multiple local CGs and/or multiple remote CGs may protect a single local CG. In addition, those skilled in the art will appreciate a cross-site high-availability (HA) solution may include more than two clusters, in which a mirrored copy of a dataset of a primary (master) cluster is stored on more than one secondary (slave) cluster.

The various nodes (e.g., storage nodes 136a-n and storage node 200) of the distributed storage systems described herein, and the processing described below with reference to the flow diagrams of FIGS. 7-8 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 9 below.

Figure 6A:
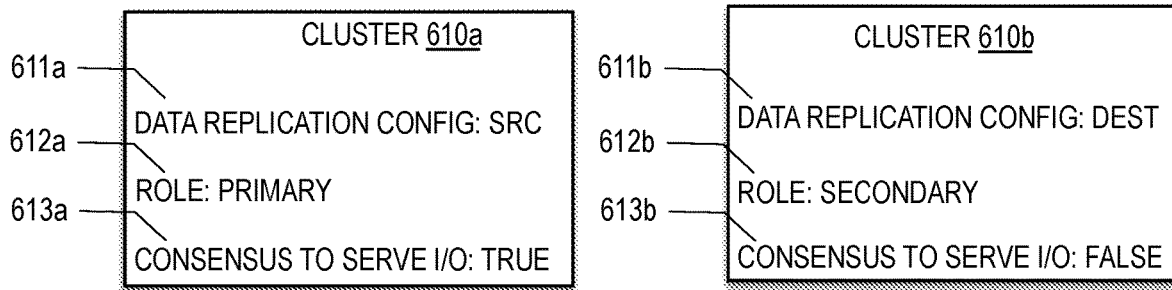
FIG. 6A is a block diagram illustrating a state of a cross-site HA storage solution prior to a failover in accordance with an embodiment.

FIG. 6A is a block diagram illustrating a state of a cross-site HA storage solution prior to a failover event in accordance with an embodiment. In the context of the present example, two clusters (e.g., cluster 610a and clusters 610b) of the cross-site HA storage solution are shown each including respective data replication configurations (e.g., data replication configuration 611a and 611b), roles (e.g., role 611a and 612b), and consensus to serve I/O flags (e.g., consensus to serve I/O 613a and 613b). As noted above, the clusters may maintain their respective configuration and status information within a configuration database (e.g., RDB 112a or RDB 112b).

In this example, cluster 610a starts out as the primary (master) for a particular CG (not shown) as indicated by role 612a. As such, cluster 610a hosts the master copy of the dataset for the member volumes of the particular CG and is the source of data replication performed between clusters 610a-b to facilitate zero RPO and zero RTO protections as indicated by the data replication source 611a. Stated another way the direction of data replication for the CG at issue is from cluster 610a to cluster 610b. The consensus to serve I/O flag 613a indicates the consensus (based on the use of a distributed consensus protocol) among the participants in the cross-site HA storage solution (e.g., cluster 610a, cluster 610b, and a mediator (e.g., mediator 120) that acts as an arbitrator for the CG at issue) regarding whether cluster 610a is the primary data serving entity for the mirrored dataset associated with the CG at issue. In the context of the present example, at any given time only one cluster participating in the cross-site HA storage solution will have consensus for a particular operation. In this this case, the consensus to serve I/O. In this example, as between cluster 610a and cluster 610b, cluster 610a currently has the consensus to serve I/O.

Turning now to cluster 610b, in this example, it is shown starting out as the secondary (slave) for the particular CG as indicated by role 612b. As such, cluster 610b hosts the mirror copy of the dataset for the member volumes of the particular CG and is the destination of data replication performed between clusters 610a-b as indicated by the data replication source 611b. The consensus to serve I/O flag 613a indicates the consensus among the participants in the cross-site HA storage solution regarding whether cluster 610b is the primary data serving entity for the mirrored dataset associated with the CG at issue. As cluster 610a currently has the consensus to serve I/O, cluster 610b does not.

Figure 6B:
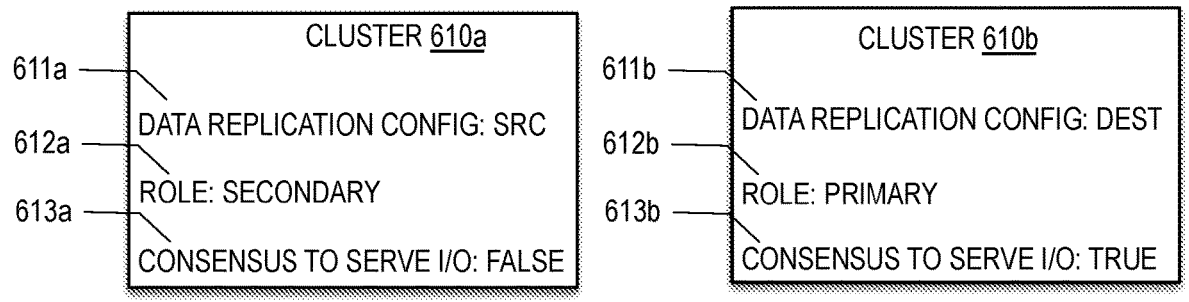
FIG. 6B is a block diagram illustrating a state of the cross-site HA storage solution of FIG. 6A after the failover in accordance with an embodiment.

FIG. 6B is a block diagram illustrating a state of the cross-site HA storage solution of FIG. 6A after the failover in accordance with an embodiment. As noted above, responsive to a planned or unplanned failover event, a failover process is performed to switch the roles of the primary and secondary data serving entities, for example, by setting the role 612a to secondary and setting the role 612b to primary. As cluster 610b is now intended to be the primary data serving entity for the mirrored dataset associated with the CG at issue, cluster 610b may also obtain the consensus to serve I/O within the cross-site HA storage solution as indicated by the consensus to serve I/O 613b. While this may be sufficient to allow an application that is reliant on the mirrored dataset associated with the CG at issue to avoid disruption, it is not sufficient to maintain zero RPO and zero RTO protections as the direction of data replication as indicated by data replication configuration 611a and 611b is now inconsistent with the respective roles of the clusters, which still identify cluster 610a as the source of data replication and cluster 610b as the destination of data replication.

Depending upon the particular failover scenario (e.g., a planned failover vs. an unplanned failover), this post-failover inconsistency may be corrected in a number of ways. For example, after a planned failover, the entity or process within the cross-site HA storage solution that initiated the planned failover may trigger performance of a data replication configuration re-alignment (or data replication configuration flip). Alternatively, the data replication configuration re-alignment may be triggered manually, for example, via a request by an administrative user of the cross-site HA storage solution. In contrast, after performance of an unplanned failover, the post-failover inconsistency between a cluster's role and the cluster's data replication configuration may be detected by one of the clusters. According to one embodiment, by convention, the post-failover inconsistency is detected by a periodic process that runs on the destination. An example of such a periodic process is described further below with reference to FIG. 7.

The simplified example described with reference to FIG. 6B is not intended to illustrate all possible states in which a peered pair of clusters may be after performance of a failover from a primary to a secondary cluster. As those skilled in the art will appreciate due to the distributed nature of the cross-site HA storage solution and the potential for the failover process to itself fail prior to completion, the clusters may be left in an intermediate state in which the roles 612a and 612b of both clusters are identified as primary. Similarly, in another potential intermediate state, the data replication configurations 611a and 611b of both clusters may identify both as the destination of data replication. Together, the periodic validation check described herein and the data replication configuration re-alignment process described below with reference to FIG. 8 are capable of handling all such intermediate and/or post-failover processing states.

Figure 6C:
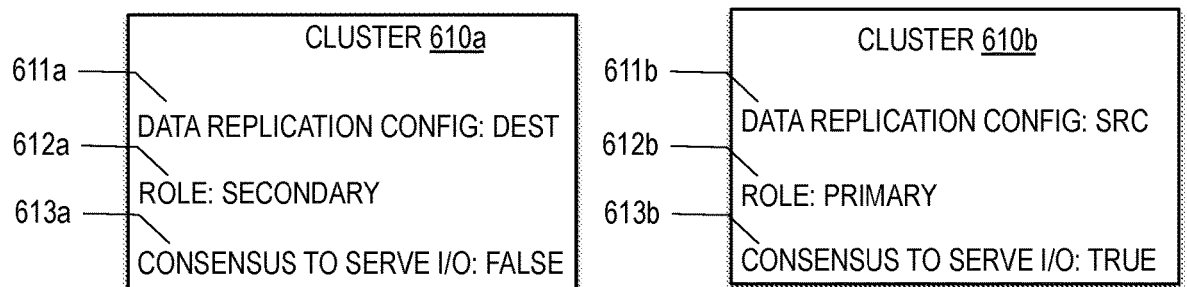
FIG. 6C is a block diagram illustrating a state of the cross-site HA storage solution of FIG. 6B after a data replication configuration flip has been performed in accordance with an embodiment.

FIG. 6C is a block diagram illustrating a state of the cross-site HA storage solution of FIG. 6B after a data replication configuration flip has been performed in accordance with an embodiment. At this point, the direction of data replication as indicated by data replication configuration 611a and 611b is consistent with the respective roles of the clusters (post-failover), which now identify cluster 610b as the source of data replication and cluster 610a as the destination of data replication.

While in the context of the present example, configuration and status information is shown for a single CG, it is to be appreciated this information may be maintained for multiple CGs.

Periodic Configuration Validation

Figure 7:
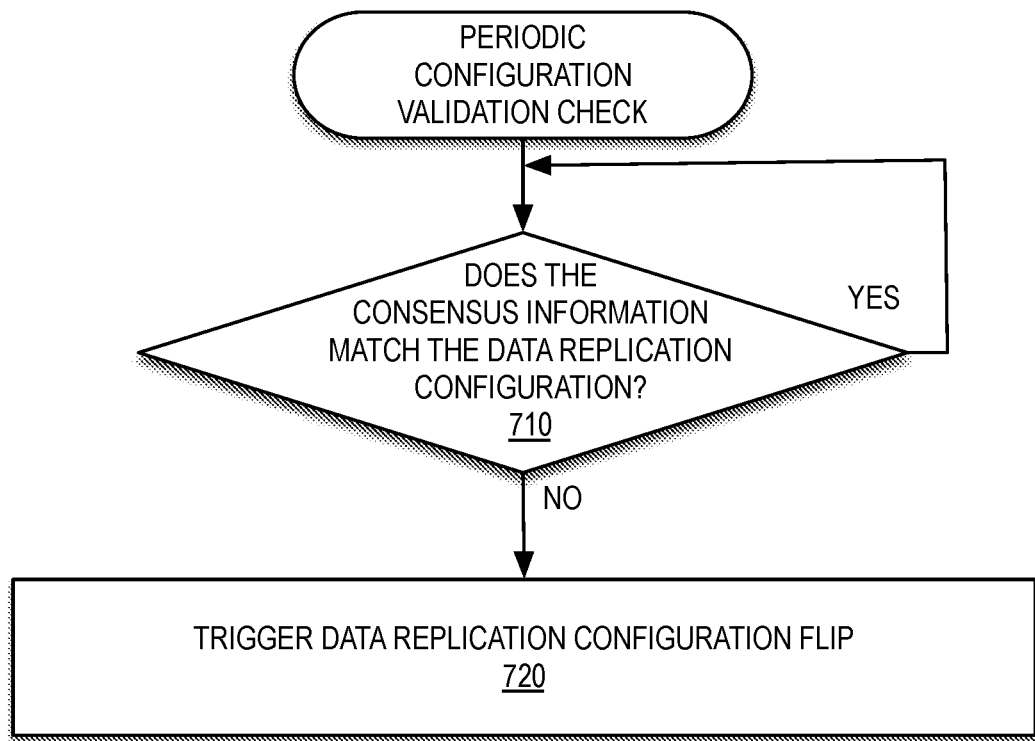
FIG. 7 is a flow diagram illustrating periodic configuration validation processing in accordance with an embodiment of the present disclosure.

FIG. 7 is a flow diagram illustrating periodic configuration validation processing in accordance with an embodiment of the present disclosure. In the context of the present example, the periodic configuration validation processing is performed, by convention, by the distributed storage system (e.g., cluster 135 or cluster 145) that is configured as the destination of data replication (e.g., the role 612a or 612b is "dest"). Those skilled in the art will appreciate this convention could be reversed to have the source of the data replication perform the periodic configuration validation processing with other appropriate modifications.

At decision block 710, it is determined whether the consensus information matches the data replication configuration. If not, processing continues with block 720; otherwise; processing loops back to decision block 710. According to one embodiment, this periodic configuration validation check may be performed in response to an event (e.g., upon a reboot process being started) or may be triggered at a set periodic interval (e.g., 5 minutes) by a timer thread, for example. Depending upon the particular implementation, the periodic configuration validation check may be implemented by a time-based job scheduler, such as a cron software utility (a/k/a a cron job).

As noted above, in the context of various examples described herein, the local configuration and state information (e.g., data replication configurations 611a-b and roles 612a-b) maintained by a particular distributed storage system is not authoritative after a failover as such information may be in an intermediate state due to the occurrence of a failure during failover processing. That is, the local configuration and state information should not be used as the true authority to determine the direction of data replication or the primary (master) data serving entity. As such, in the context of the present example, the true authority for determining the primary data serving entity is the consensus to serve I/O flag (e.g., consensus to serve I/O 613a or 613b, as the case may be).

According to one embodiment, a match between consensus information (e.g., the local consensus to serve I/O flag) and data replication configuration (e.g., data replication configuration 611a or 611b) means the consensus to serve I/O flag (e.g., consensus to serve I/O 613a or 613b) is consistent with the corresponding data replication configuration. For example, a distributed storage system that is configured to operate as the destination of data replication is consistent with the distributed storage system being the secondary data serving entity for the CG at issue, which means the distributed storage system should not have the consensus to serve I/O (e.g., consensus to serve I/O 612a or 612b, as the case may be, is false) for the mirrored dataset associated with the CG. Similarly, a distributed storage system that is configured to operate as the source of the data replication is consistent with the distributed storage system being the primary data serving entity for the CG and having the consensus to serve I/O (e.g., consensus to serve I/O 612a or 613b, as the case may be, is true). As by convention, in the context of the present example, this periodic configuration validation check is assumed to be performed by the destination, the determination is affirmative when the consensus information indicates the distributed storage system at issue does not have the consensus to serve I/O (which is the expected situation for the destination) and is negative when the consensus information indicates the distributed storage system has the consensus to serve I/O (which represents a conflict between the configured role as a destination for data replication).

At block 720, a data replication configuration flip is triggered as the current data replication configuration of the distributed storage system at issue was determined at decision block 710 to be inconsistent with the current state of the consensus to serve I/O flag. For example, assuming the periodic configuration validation check is being performed by a distributed storage system having a current configuration as the destination of data replication, it would be inconsistent for the distributed storage system to have a consensus to serve I/O flag set to true. In the context of the present example, such an inconsistency is indicative of a failover process having been performed since the last configuration validation check and indicative that a data replication configuration flip should be performed to re-establish zero RPO and zero RTO protections for the mirrored dataset at issue. Notably, in a scenario in which both distributed storage systems are in an intermediate state in which both are marked as the destination (e.g., both data replication configuration 611a and 611b indicate "destination) and/or both are marked as the primary data serving entity (e.g., both roles 612a and 612b indicate "primary"), only one will trigger the data replication configuration flip as only one can have the consensus to serve I/O, which is the true primary data serving entity for the CG at issue.

While the above-described example illustrates a data replication re-alignment process that is useful in the context of synchronous replication being performed within a cross-site Ha storage solution by automatically performing the data replication re-alignment responsive to the consensus value being found by the destination to be in conflict with the data replication direction, in alternative embodiments, a different form of data replication re-alignment may be performed in an environment in which asynchronous replication is being performed to support planned failover in a cross-site asynchronous disaster recovery (DR) solution. For example, rather than determining whether the consensus information matches the data replication configuration, this check could be to test whether the destination is read-writable. Alternatively, still, the data replication configuration flip of block 720 may be manually triggered responsive to input from an administrative user of the cross-site asynchronous DR solution.

Data Replication Configuration Re-Alignment

Figure 8:
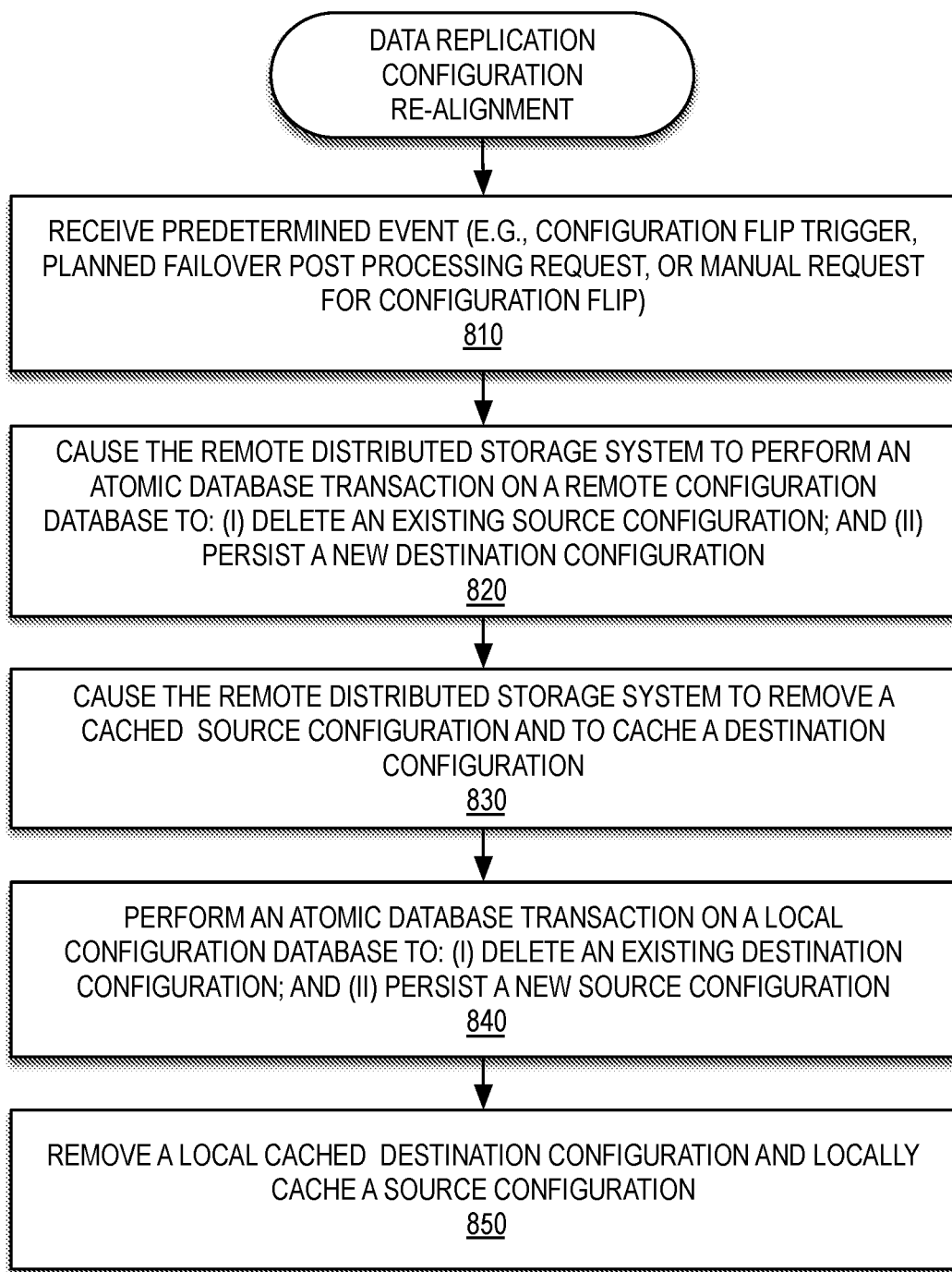
FIG. 8 is a flow diagram illustrating data replication configuration re-alignment processing in accordance with an embodiment of the present disclosure.

FIG. 8 is a flow diagram illustrating data replication configuration re-alignment processing in accordance with an embodiment of the present disclosure. As noted above, with reference to FIG. 6B, there are a variety of post-failover inconsistent states in which the distributed storage systems (e.g., clusters 135 and 145) of a cross-site HA storage solution may be after the performance of a failover from one distributed storage system to another. In the context of the present example, performance of a data replication configuration re-alignment (or data replication configuration flip) is intended to make the data replication configurations of the distributed storage systems consistent with the new post-failover roles of the distributed storage systems as primary or secondary data serving entities.

Assuming cluster A was the original primary and a failover operation has been performed has switched cluster B to the operate as the new primary, the process described below starts with the direction of data replication being identified as A to B as the original data replication state (e.g., A is configured as the "source" of data replication and B is configured as the "destination" of data replication) and ends with the direction of data replication being identified as B to A (e.g., B is now configured as the "source" of data replication and A is now configured as the "destination" of data replication).

At block 810, a predetermined event is received that indicates a data replication configuration re-alignment should be performed. Depending upon the particular implementation, a number of different events may trigger the data replication configuration re-alignment. For example, after a planned failover, the entity or process within the cross-site HA storage solution that initiated the planned failover may trigger performance of a data replication configuration re-alignment. Alternatively, the data replication configuration re-alignment may be triggered manually, for example, via a request by an administrative user of the cross-site HA storage solution. In contrast, after performance of an unplanned failover, a post-failover inconsistency between the authoritative source of information identifying a distributed storage system's role as a primary data serving entity and the distributed storage system's data replication configuration as a destination may be detected by the destination, for example, by performing a periodic configuration validation check as described above with reference to FIG. 7.

At block 820, according to one embodiment, the true primary distributed storage system may be first be determined based on which of the distributed storage systems participating in the cross-site HA storage solution has the consensus to serve I/O (which is the true authoritative source on this issue). The true primary distributed storage system causes the remote distributed storage system to perform an atomic database transaction on a remote configuration database (e.g., RDB 512a or RDB 512b, as the case may be) to (i) delete an existing source configuration, identifying the remote distributed storage system as the source of data replication for the CG at issue; and (ii) persist a new destination configuration, identifying the remote distributed storage system as the destination of data replication for the CG at issue. Performance of this database transaction may be said to be performed with atomicity. Either both portions of the transaction are performed successfully or neither is committed.

At block 830, the true primary distributed storage system next causes the remote distributed storage system to remove any cached source configuration (e.g., cached in the control plane) and to cache a destination configuration.

At block 840, the true primary distributed storage system next performs an atomic database transaction on its local configuration database (e.g., RDB 512a or RDB 512b, as the case may be) to (i) delete an existing destination configuration, identifying the local distributed storage system as the destination of data replication for the CG at issue; and (ii) persist a new source configuration, identifying the local distributed storage system as the source of data replication for the CG at issue. As above, performance of this database transaction may be said to be performed with atomicity. Either both portions of the transaction are performed successfully or neither is committed.

At block 850, the true primary distributed storage system next removes any locally cached destination configuration (e.g., cached in the control plane) and to cache a source configuration. At this point, the true primary distributed storage system may trigger a process to resynchronize the state of the member volumes of the CG at issue to their appropriate post-failover state as primary or secondary as the case may be consistent with the consensus to serve I/O flag.

Notably, in one embodiment, despite a potential intervening failure between any of the above blocks, the data replication configuration re-alignment process is both restartable and guaranteed to eventually complete. For example, all processing steps described above may be implemented as idempotent to be restarted from the start or a known point in the event of failures.

According to one embodiment, restartability for any failures before block 840 is covered by the existence of the destination cache entry stored on the true primary, which ensures, for example, the periodic configuration validation check can trigger the data replication configuration flip workflow for the CG relationship at issue.

According to one embodiment, restartability for block 850 is covered by cache consistency infrastructure that performs general cache coherency techniques to maintain consistency. For example, the cache may be periodically checked for consistency with the authoritative information and when found to be non-existent or inconsistent a seeding process may be initiated to achieve consistency between the cache and the authority.

According to one embodiment, restartability for resynchronizing the state of the member volumes of the CGs at issue is covered due to the completion of the caching of a destination configuration at block 830, which ensures the periodic configuration validation check can trigger performance of an automatic resynchronization workflow by the remote distributed storage system.

In various embodiments, serialization is performed to ensure the desired order of events in the distributed setup of the cross-site HA storage solution. Due to the distributed nature of the participating distributed storage systems and the potential multiple trigger points of recovery, it is possible that these steps described above could be attempted out of order. For instance, completion of caching of the destination configuration in block 830 could trigger an auto resynchronization to be performed prior to completion of block 840; however, in one embodiment, serialization is ensured by detecting and failing the forward operation if the previous steps have yet to be completed. In this particular case, the automatic resynchronization will be rejected by the remote distributed storage system if a destination cache entry exists for the CG relationship.

It is appreciated that the order of steps can lead to both distributed storage systems having a destination configuration on its end, for example, in connection with a failure between blocks 830 and 840; however, this is a transient state that will auto-correct itself eventually and the replication in the data path will always flow in one direction.

Those skilled in the art will appreciate this convention could be reversed to have the source of the data replication perform the periodic configuration validation processing with other appropriate modifications.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 9:
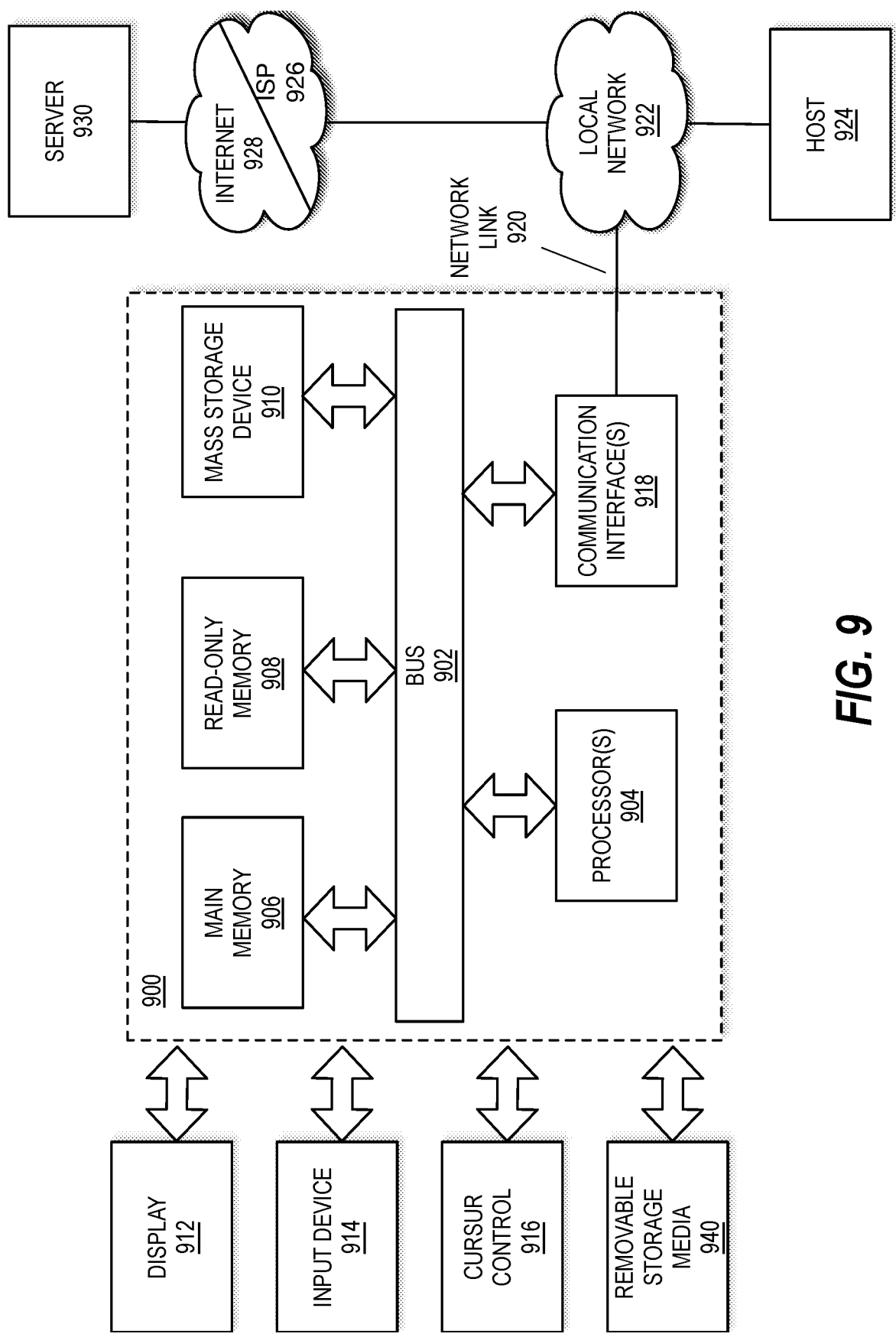
FIG. 9 illustrates an example computer system in which or with which embodiments of the present disclosure may be utilized.

FIG. 9 is a block diagram that illustrates a computer system 900 in which or with which an embodiment of the present disclosure may be implemented. Computer system 900 may be representative of all or a portion of the computing resources associated with a node (e.g., storage nodes 136a-n or storage nodes 146a-n) of a distributed storage system (e.g., cluster 235 or 245) or an administrative work station (e.g., computer system 110 or 210). Notably, components of computer system 900 described herein are meant only to exemplify various possibilities. In no way should example computer system 900 limit the scope of the present disclosure. In the context of the present example, computer system 900 includes a bus 902 or other communication mechanism for communicating information, and a processing resource (e.g., a hardware processor 904) coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other non-volatile storage for later execution.

What is claimed is:
1. A method comprising:
maintaining, by a local cluster of a high-availability (HA) storage solution that is operable within a first site, a local configuration database including configuration information indicative of a direction of data replication for a dataset of a local consistency group (CG) that is mirrored between the local CG and a remote CG, wherein the local CG includes a plurality of volumes of the local cluster and the remote CG includes a corresponding plurality of volumes of a remote cluster of the HA storage solution that is operable within a second site;
responsive to a failover that has caused (i) the local cluster to be placed into a primary role for serving input/output (I/O) operations relating to the mirrored dataset and (ii) the remote cluster to be placed into a secondary role for serving the I/O operations:
causing, by the local cluster, the remote cluster, with atomicity on a remote configuration database, to:
delete an existing source configuration persisted within the remote configuration database that identifies the remote cluster as a source of data replication; and
persist a new destination configuration within the remote configuration database that identifies the remote cluster as a destination of the data replication;
with atomicity on the local configuration database:
deleting, by the local cluster, an existing destination configuration persisted within the local configuration database that identifies the local cluster as the destination; and
persisting, by the local cluster, a new source configuration within the local configuration database that identifies the local cluster as the source.

2. The method of claim 1, further comprising, prior to deletion of the existing destination configuration persisted within the local configuration database:
causing, by the local cluster, the remote cluster to remove a cached source configuration that identifies the remote cluster as the source; and
causing, by the local cluster, the remote cluster to cache a destination configuration that identifies the remote cluster as the destination.

3. The method of claim 1, further comprising, after persisting the new destination configuration:
removing, by the local cluster, a cached destination configuration that identifies the local cluster as the destination; and
caching, by the local cluster, a source configuration that identifies the local cluster as the source.

4. The method of claim 1, wherein the remote configuration database includes configuration information indicative of the direction of data replication for the mirrored dataset.

5. The method of claim 4, wherein zero recovery point objective (RPO) and zero recovery time objective (RTO) protections are reestablished after the failover by automatically flipping the configuration information indicative of the direction of data replication in the local configuration database and in the remote configuration database responsive to a consensus to serve I/O indicator stored on the local cluster being found to be in conflict with the existing destination configuration by a periodic process associated with the local cluster.

6. The method of claim 5, wherein the failover comprises a planned failover and wherein the configuration information indicative of the direction of data replication in the local configuration database and in the remote configuration database is flipped automatically in response to completion of the planned failover.

7. The method of claim 1, wherein zero RPO and zero RPO protections are supported by maintenance of the local configuration database and the remote configuration database.

8. A distributed storage system (DSS) of a high-availability (HA) storage solution, the DSS comprising:
 a processing resource; and
 a non-transitory computer-readable media, coupled to the one or more processing resources, having stored therein instructions that when executed by the processing resource cause the DSS to:
  maintain a local configuration database including configuration information indicative of a direction of data replication for a dataset of a local consistency group (CG) that is mirrored between the local CG and a remote CG, wherein the local CG includes a plurality of volumes of the DSS and the remote CG includes a corresponding plurality of volumes of a remote DSS of the HA storage solution that is operable at a different site than the DSS;
  responsive to a failover that has caused (i) the DSS to be placed into a primary role for serving input/output (I/O) operations relating to the mirrored dataset and (ii) the remote DSS to be placed into a secondary role for serving the I/O operations:
   cause the remote DSS, with atomicity on a remote configuration database, to:
    delete an existing source configuration persisted within the remote configuration database that identifies the remote cluster as a source of data replication; and
    persist a new destination configuration within the remote configuration database that identifies the remote cluster as a destination of the data replication;
   with atomicity on the local configuration database:
    delete an existing destination configuration persisted within the local configuration database that identifies the local cluster as the destination; and
    persist a new source configuration within the local configuration database that identifies the local cluster as the source.

9. The DSS of claim 8, wherein the instructions further cause the DSS to prior to deletion of the existing destination configuration persisted within the local configuration database:
 cause the remote DSS to remove a cached source configuration that identifies the remote cluster as the source; and
 cause the remote DSS to cache a destination configuration that identifies the remote cluster as the destination.

10. The DSS of claim 8, wherein the instructions further cause the DSS to after persisting the new destination configuration:
 remove a cached destination configuration that identifies the local cluster as the destination; and
 cache a source configuration that identifies the local cluster as the source.

11. The DSS of claim 8, wherein the remote configuration database includes configuration information indicative of the direction of data replication for the mirrored dataset.

12. The DSS of claim 11, wherein zero recovery point objective (RPO) and zero recovery time objective (RTO) protections are reestablished after the failover by automatically flipping the configuration information indicative of the direction of data replication in the local configuration database and in the remote configuration database responsive to a consensus to serve I/O indicator stored on the DSS being found to be in conflict with the existing destination configuration by a periodic process associated with the DSS.

13. The DSS of claim 12, wherein the failover comprises a planned failover and wherein the configuration information indicative of the direction of data replication in the local configuration database and in the remote configuration database is flipped automatically in response to completion of the planned failover.

14. The DSS of claim 8, wherein zero RPO and zero RPO protections are supported by maintenance of the local configuration database and the remote configuration database.

15. A non-transitory computer-readable storage medium embodying a set of instructions, which when executed by a processing resource of a local cluster of a high-availability (HA) storage solution operable at a first site, cause the local cluster to:
 maintain a local configuration database including configuration information indicative of a direction of data replication for a dataset of a local consistency group (CG) that is mirrored between the local CG and a remote CG, wherein the local CG includes a plurality of volumes of the local cluster and the remote CG includes a corresponding plurality of volumes of a remote cluster of the HA storage solution that is operable at a second site;
 responsive to a failover that has caused (i) the local cluster to be placed into a primary role for serving input/output (I/O) operations relating to the mirrored dataset and (ii) the remote cluster to be placed into a secondary role for serving the I/O operations:
  cause the remote cluster, with atomicity on a remote configuration database, to:
   delete an existing source configuration persisted within the remote configuration database that identifies the remote cluster as a source of data replication; and
   persist a new destination configuration within the remote configuration database that identifies the remote cluster as a destination of the data replication;
  with atomicity on the local configuration database:
   delete an existing destination configuration persisted within the local configuration database that identifies the local cluster as the destination; and
   persist a new source configuration within the local configuration database that identifies the local cluster as the source.

16. The non-transitory computer-readable storage medium of claim 14, wherein the instructions further cause the local cluster to prior to deletion of the existing destination configuration persisted within the local configuration database:
 cause the remote cluster to remove a cached source configuration that identifies the remote cluster as the source; and
 cause the remote cluster to cache a destination configuration that identifies the remote cluster as the destination.

17. The non-transitory computer-readable storage medium of claim 15, wherein the instructions further cause the local cluster to after persisting the new destination configuration:
  remove a cached destination configuration that identifies the local cluster as the destination; and
  cache a source configuration that identifies the local cluster as the source.

18. The non-transitory computer-readable storage medium of claim 15, wherein the remote configuration database includes configuration information indicative of the direction of data replication for the mirrored dataset.

19. The non-transitory computer-readable storage medium of claim 16, wherein zero recovery point objective (RPO) and zero recovery time objective (RTO) protections are reestablished after the failover by automatically flipping the configuration information indicative of the direction of data replication in the local configuration database and in the remote configuration database responsive to a consensus to serve I/O indicator stored on the local cluster being found to be in conflict with the existing destination configuration by a periodic process associated with the local cluster.

20. The non-transitory computer-readable storage medium of claim 17, wherein the failover comprises a planned failover and wherein the configuration information indicative of the direction of data replication in the local configuration database and in the remote configuration database is flipped automatically in response to completion of the planned failover.

* * * * *